United States Patent [19]

Onozaki

[11] Patent Number: 5,361,060
[45] Date of Patent: Nov. 1, 1994

[54] DATA TRANSMISSION APPARATUS AND METHOD OF OPERATING THE SAME

[75] Inventor: Manabu Onozaki, Nara, Japan

[73] Assignee: Sharp Kabushiki Kaisha, Osaka, Japan

[21] Appl. No.: 821,065

[22] Filed: Jan. 16, 1992

[30] Foreign Application Priority Data

Jan. 18, 1991 [JP] Japan .................. 3-004113

[51] Int. Cl.[5] ............... H01H 63/36; H04Q 11/04; H04J 3/06; G06F 13/00
[52] U.S. Cl. ................. 340/825.02; 370/60; 370/94.1; 340/825.03
[58] Field of Search ............ 340/825.01, 825.02, 340/825.03, 825.05, 825.5, 825.2, 825.08; 370/58.2, 59, 60.1, 60, 61, 94.1, 112; 375/106, 4, 20, 106, 107, 109, 117, 118

[56] References Cited

U.S. PATENT DOCUMENTS

| | | |
|---|---|---|
| 3,708,690 | 1/1973 | Paivinen . |
| 4,873,703 | 10/1989 | Crandall et al. ............. 375/106 |
| 4,890,280 | 12/1989 | Hirata ............................. 370/60 |
| 4,935,922 | 6/1990 | Wicklund et al. ............. 370/60 |
| 4,985,890 | 1/1991 | Matsumoto et al. ......... 370/94.1 |
| 5,008,880 | 4/1991 | Azuma ......................... 370/94.1 |

Primary Examiner—Donald J. Yusko
Assistant Examiner—Mark H. Rinehart

[57] ABSTRACT

A data transmission path includes a transfer control circuit and a data hold circuit. The transfer control circuit outputs a transmission signal for transferring the data held by the data hold circuit to a data transmission path in a succeeding stage in response to an existence of data to be transferred in the data hold circuit, non-existence of data in the data transmission path in the succeeding stage and an externally applied timing signal.

25 Claims, 13 Drawing Sheets

FIG. 3
(a)
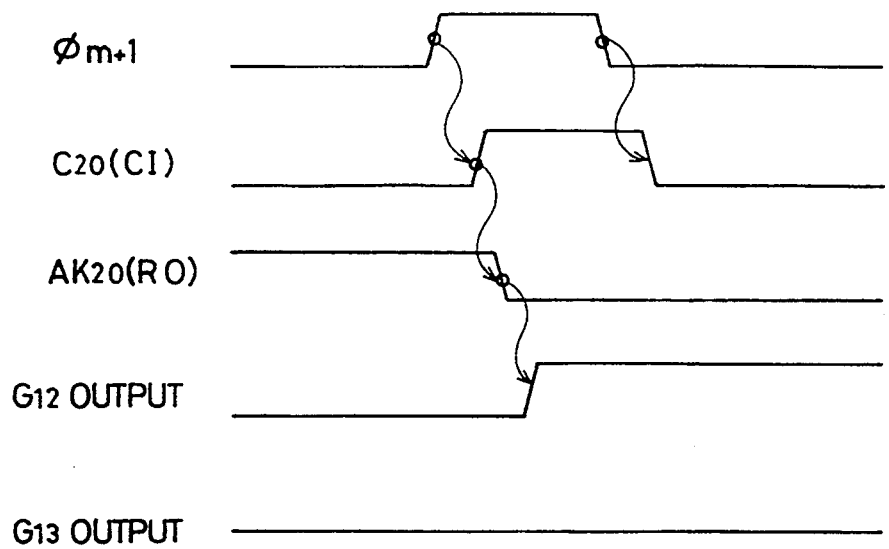
(b)
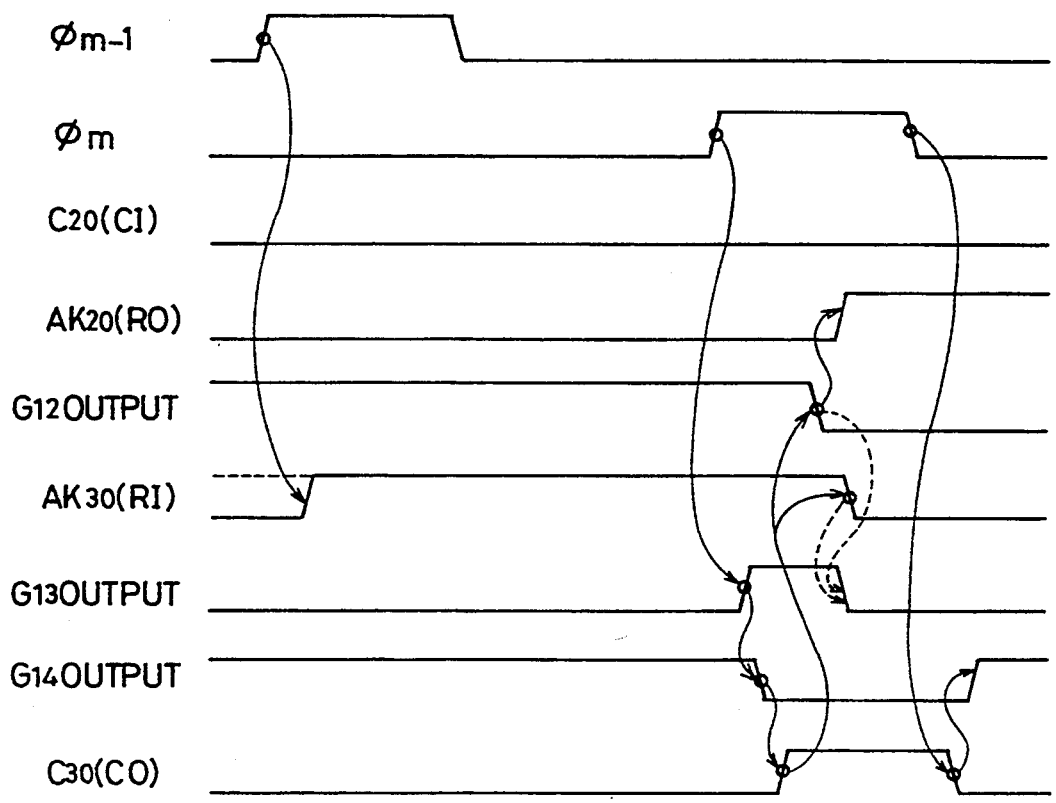

FIG. 9

| | | (AK110, AK120) | | | |
|---|---|---|---|---|---|
| | | (0,0) | (0,1) | (1,1) | (1,0) |
| FL130 | 0 | 1 | 1 | — | 0 |
| | 1 | 0 | 1 | — | 0 |

AK110, AK120: "0", WHEN DATA EXISTS IN DATA TRANSMISSION PATHS 110,120
"1", WHEN NO DATA EXISTS IN DATA TRANSMISSION PATHS 110, 120

FL130: "1", WHEN LATEST DATA TRANSMITTED TO DATA TRANSMISSION PATH 130 COME FROM DATA TRANSMISSION PATH 110
"0", WHEN THE SAME COME FROM DATA TRANSMISSION PATH 120

OUTPUT: "1", WHEN DATA TRANSMISSION PATH 110 IS SELECTED
"0", WHEN DATA TRANSMISSION PATH 120 IS SELECTED

DATA TRANSMISSION APPARATUS AND METHOD OF OPERATING THE SAME

BACKGROUND OF THE INVENTION

1. Field of the Invention

The present invention relates generally to data transmission apparatuses, and more particularly, to data transmission apparatuses for controlling packet flow of a data transmission path and a method of operating such apparatuses.

2. Description of the Background Art

Such a data processor as a FIFO (First-In.First-Out) memory or a data driven type information processor employs a data transmission apparatus using an asynchronous handshaking circuit. Such a data transmission apparatus includes a plurality of data transmission paths connected to each other to send and receive a transmission signal and a transmission acknowledging signal for autonomous data transfer.

FIG. 14 shows one example of a conventional data transmission path. A data transmission path 10a includes a transfer control circuit 11a and a data hold circuit 12a. The data hold circuit 12a holds input data DI and outputs the same as output data DO in response to a fall of a transmission signal C2 applied from the transfer control circuit 11a.

FIG. 15 is a circuit diagram showing the structure of the transfer control circuit 11a and FIG. 16 is a timing chart illustrating the operation of the transfer control circuit 11a.

As shown in FIG. 15, the transfer control circuit 11a includes NAND gates G1, G2 and G5, inverters G3 and G4 and a buffer G6.

The operation will be described in a case where a data transmission path in a subsequent stage is in a ready state.

When the data transmission path in the subsequent stage is in a ready state, an "H" (logic high level) transmission acknowledging signal AK2 is applied from a transfer control circuit in the subsequent stage. In response to a fall of a transmission signal C1 applied from a preceding stage portion to "L" (logic low level), the output of the NAND gate G2 attains "H". As a result, a transmission acknowledging signal AK1 output from the inverter G4 attains "L" (inhibited state). Meanwhile, the output of the NAND gate G5 attains "L" and the output of the inverter G3 attains "H". At this time, with the transmission acknowledging signal AK2 attaining "H", the output of the NAND gate G1 falls to "L". As a result, a transmission signal C2 falls to "L".

The data hold circuit 12a shown in FIG. 14 holds the input data DI and outputs the same as the output data DO in response to the fall of the transmission signal C2.

The transfer control circuit in the subsequent stage receiving the transmission signal C2 brings the transmission acknowledging signal AK2 to "L" in response to the fall of the transmission signal C2.

In response to the fall of the output of the NAND gate G1, the output of the NAND gate G5 attains an "H" and the inverter G3 attains "L" to bring the output of the NAND gate G1 to "H" again. As a result, the transmission signal C2 rises to "H" again. The transmission signal C2 falls to "L" and rises to "H" after a lapse of a predetermined time in this way.

The transmission signal C1 applied from the preceding stage portion rises to "H" after a lapse of a fixed time. The output of the NAND gate G2 falls to "L" and the output of the inverter G4 rises to "H". As a result, the transmission acknowledging signal AK1 again attains "H" (acknowledged state).

As described in the foregoing, when the transmission acknowledging signal AK2 applied from the transfer control circuit in the subsequent stage is at "H" (acknowledged state), the transmission acknowledging signal AK1 to be applied to the preceding stage attains "L" (inhibited state) in response to a fall of the transmission signal C1 applied from the preceding stage portion and after a lapse of a fixed time, the transmission signal C2 to be applied to the transfer control circuit in the subsequent stage falls to "L".

An operation in the event that a data transmission path in the subsequent stage is clogged will be described.

In this case, the transmission acknowledging signal AK2 applied from the transfer control circuit in the subsequent state is at "L" (inhibited state). When the transmission signal C1 applied from the preceding stage portion falls to "L", the output of the NAND gate G2 attains "H" and the output of the inverter G4 falls to "L". As a result, transmission acknowledging signal AK1 falls to "L". When the transmission acknowledging signal AK2 applied from the transfer control circuit in the subsequent stage is at "L" (inhibited state), the output of the NAND G1 is at "H". Therefore, as long as the transmission acknowledging signal AK2 is at "L", the transmission signal C2 to be applied to the transfer control circuit in the subsequent stage maintains "H". No data is transmitted from the data transmission path 10a to a data transmission path in the subsequent stage as a result.

When the transmission acknowledging signal AK2 applied from the transfer control circuit in the subsequent stage rises to "H" (acknowledged state), the output of the NAND gate G1 falls to a "L" level. As a result, the transmission signal C2 to be applied to the transfer control circuit in the subsequent stage falls to "L". In response to the fall of the transmission signal C2, the data hold circuit 12a shown in FIG. 14 holds the input data DI and outputs the same as the output data DO.

Meanwhile, in response to the fall of the transmission signal C2 applied from the transfer control circuit 11a, the transfer control circuit in the subsequent stage brings the transmission acknowledging signal AK2 to "L" (inhibited state) after a lapse of a fixed time. In response to the rise of the transmission acknowledging signal AK2 applied from the transfer control circuit in the subsequent stage, the transmission acknowledging signal AK1 to be applied to the preceding stage portion rises to "H" (acknowledged state) after a lapse of a fixed time.

As described above, when the transmission acknowledging signal AK2 applied from the transfer control circuit in the subsequent stage is at "L" (inhibited state), the transmission signal C2 to be applied to the transfer control circuit in the subsequent stage does not fall to "L". In other words, when the data transmission path in the subsequent stage is clogged, data transmission from the data transmission path 10a to the data transmission path in the subsequent stage is held off for the transmission acknowledging signal AK2 attaining "H" (acknowledged state).

In the above-described conventional data transmission apparatus, data is autonomously and sequentially transmitted to data transmission paths in the following stages in turn when a data transmission path in a subsequent stage is empty. It is therefore difficult to trace operations step by step while advancing the data stage by stage. It is also difficult to test an operation margin of the transfer control, an operation margin of the logic arranged between the data transmission paths and the like.

A data transmission apparatus using a simple shift register operable in synchronization with an externally applied clock signal without a handshaking circuit, does not perform such control as holding off data transfer when a subsequent stage is clogged and transferring data when the subsequent stage is empty.

SUMMARY OF THE INVENTION

An object of the present invention is to improve testability of a data transmission apparatus operable under the handshaking control while maintaining an excellent transfer efficiency.

Another object of the present invention is to enable a data transfer operation to be externally controlled in a data transmission path operable under the handshaking control.

A further object of the present invention is to enable a data merging operation to be externally controlled in a data transmission path operable under the handshaking control.

A further object of the present invention is to enable a data branching operation to be externally controlled in a data transmission path operable under the handshaking control.

A data transmission apparatus according to the present invention transmits data applied from a preceding stage portion to a succeeding stage portion. The data transmission apparatus includes a hold circuit for holding data applied from the preceding stage portion and a control circuit for controlling a transfer of the data held by the hold circuit. The control circuit performs control such that the data held by the hold circuit is transferred to the succeeding stage portion in response to the hold circuit holding data to be transferred, non-existence of data in the succeeding stage portion and an application of a predetermined timing signal to the control circuit.

The control circuit can include a first storing circuit, a logic circuit and a second storing circuit. The first storing circuit is set in response to the hold circuit receiving data from the preceding stage portion. The logic circuit receives the output of the first storing circuit, a signal indicative of the existence or non-existence of data in the succeeding stage portion and a predetermined timing signal and supplies a predetermined output in response to a setting of the first storing circuit, an application of the predetermined timing signal to the logic circuit and non-existence of data in the succeeding stage portion. The second storing circuit is set in response to a predetermined output of the logic circuit and reset in response to non-application of the predetermined timing signal. In response to the setting of the second storing circuit, the data held by the hold circuit is transferred to the succeeding stage portion and the first storing circuit is reset.

Preferably, the preceding stage portion generates a transmission signal for transferring data held by the hold circuit, and the first storing circuit is set and applies a signal to the preceding stage portion, which signal is for inhibiting data transfer, in response to the transmission signal. The second storing circuit, when set, generates a transmission signal for transferring data from the hold circuit to the succeeding stage portion.

In the data transmission apparatus, data is transmitted in synchronization with a predetermined timing signal while monitoring an empty state of the succeeding stage portion. It is therefore possible to operate the data transmission path at an arbitrary speed and test an operation margin by changing an input interval or a pulse width of the predetermined timing signal.

The data transmission apparatus is applicable as a data transmission path. It is therefore possible to externally control a data transfer operation in the data transmission path operable under the handshaking control.

A data transmission apparatus according to another aspect of the present invention transmits data applied from the preceding stage portion to one of a plurality of succeeding stage portions. The data transmission apparatus includes a hold circuit for holding data applied from the preceding stage portion and a control circuit for controlling a transfer of the data held by the hold circuit. The data includes identifiers specifying one of the plurality of succeeding stage portions. The control circuit performs control such that the data held by the hold circuit is transferred to a succeeding stage portion specified by the identifier in response to an existence of data to be transferred in the hold circuit, non-existence of data in the plurality of succeeding stage portions and an application of a predetermined timing signal to the control circuit.

The data transmission apparatus is applicable as a branching portion. It is therefore possible to externally control a data branching operation in a data transmission path operable under the handshaking control.

A data transmission apparatus according to a further aspect of the present invention transmits data applied from a plurality of preceding stage portions to a succeeding stage portion. The data transmission apparatus includes a plurality of hold circuits provided corresponding to the plurality of preceding stage portions for holding data applied from a corresponding preceding stage portion, a plurality of control circuits provided corresponding to the plurality of hold circuits for controlling a transfer of the data held by a corresponding hold circuit, and an arbitration circuit for selectively acknowledging data transfer to one of the plurality of control circuits. Each of the plurality of control circuits perform control such that the data held by a corresponding hold circuit is transferred to the succeeding stage portion in response to an existence of data to be transferred in a corresponding hold circuit, non-existence of data in the succeeding stage portion, acknowledgement of a data transfer by the arbitration circuit and an application of a predetermined timing signal. The arbitration circuit maintains the present state while the predetermined timing signal is being applied.

Preferably, the arbitration circuit, when data exists in one of the plurality of hold circuits, permits a corresponding control circuit to transfer data, and when data exist in the plurality of hold circuits at the same time, gives priority to a control circuit different from the previously acknowledged control circuit to transfer data.

The data transmission apparatus is applicable as a merging portion. It is therefore possible to externally control a data merging operation in a data transmission path operable under the handshaking control.

Any of the above-described data transmission apparatuses enables an improvement of testability while maintaining a data transmission efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and thus are not limitative of the present invention, and wherein:

FIG. 3 is a timing chart illustrating an operation of a transfer control circuit of FIG. 1.

FIG. 9 is a truth table of the outputs of OR gates included in the arbitration portion of FIG. 8.

DESCRIPTION OF THE PREFERRED EMBODIMENTS

Figure 1:
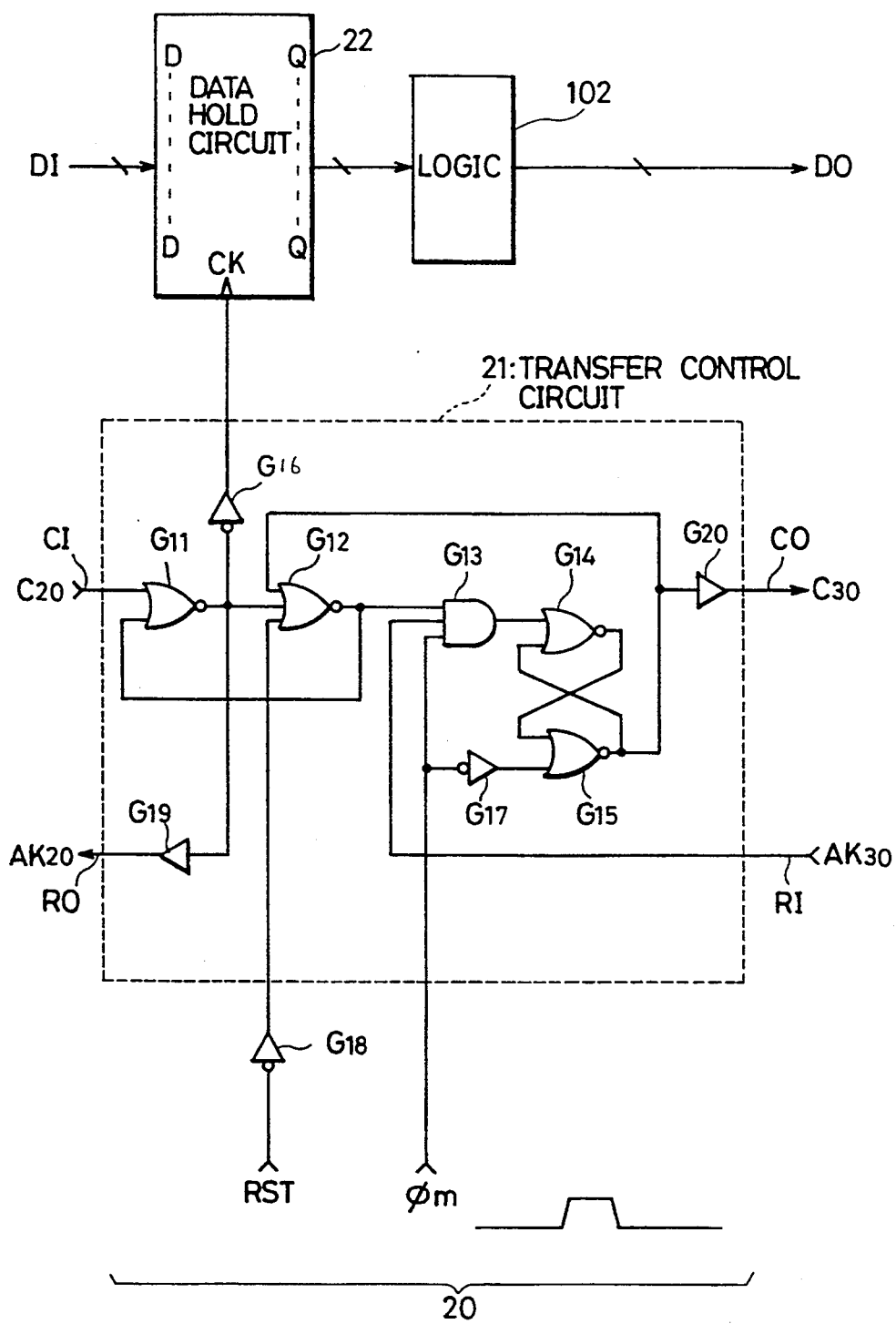
FIG. 1 is a block diagram showing the structure of a data transmission apparatus according to one embodiment of the present invention.

In FIG. 1 showing the structure of a data transmission apparatus according to one embodiment of the present invention, a transfer control circuit 21 and a data hold circuit 22 constitute a data transmission path 20. The output of the data hold circuit 22 is connected to a logic circuit 102 for a predetermined processing.

Figure 2:
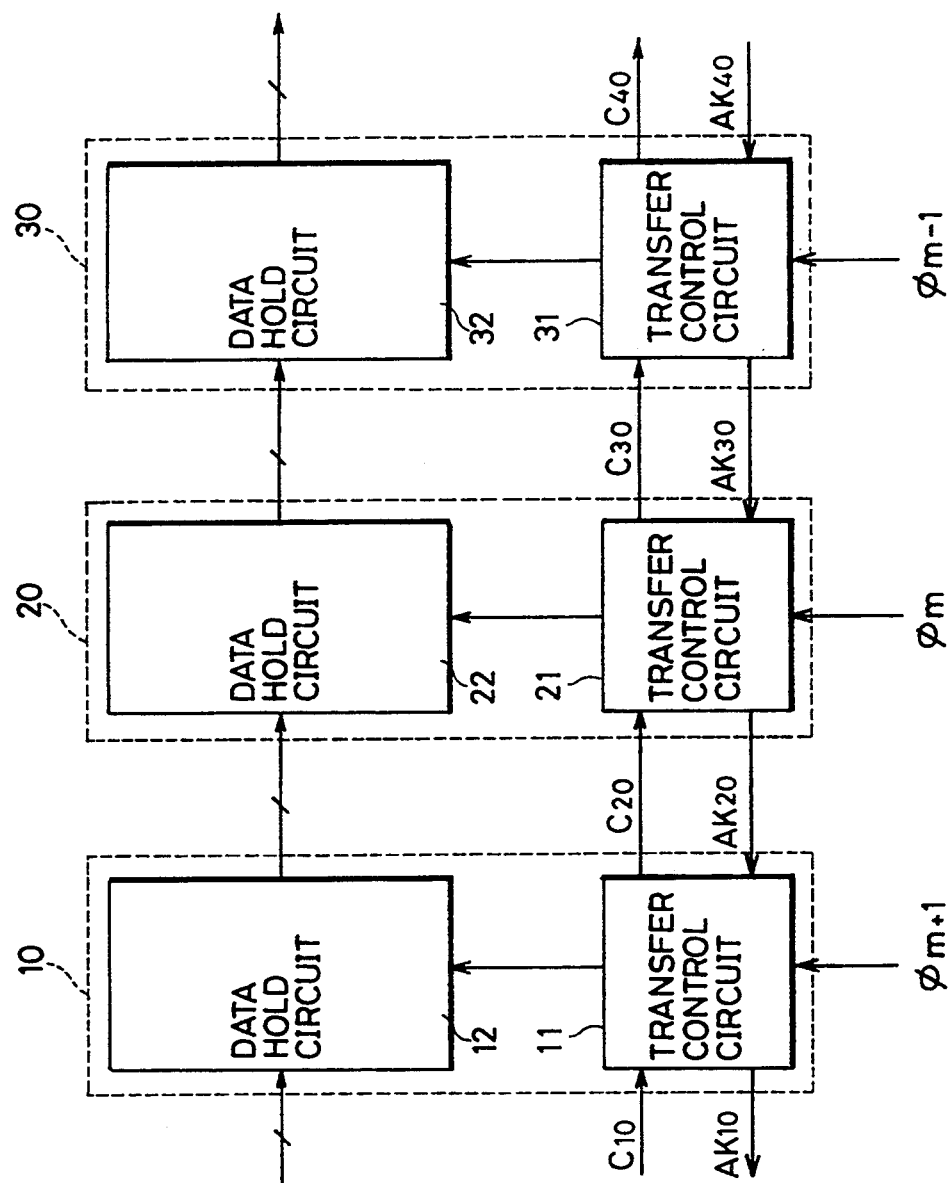
FIG. 2 is a block diagram showing a connection state of a plurality of data transmission paths.

A plurality of data transmission paths 10, 20 and 30 each having the structure as shown in FIG. 1 are connected in a manner as shown in FIG. 2. In FIG. 2, the data transmission path 10 is connected to the input of the data transmission path 20, the output of which path 20 is connected to the data transmission path 30. The data transmission path 10 includes a transfer control circuit 11 and a data hold circuit 12, and the data transmission path 30 includes a transfer control circuit 31 and a data hold circuit 32. The transfer control circuit 11 receives a transmission signal C10 from a preceding stage portion and applies a transmission acknowledging signal AK10 to the preceding stage portion. A transfer control circuit 21 receives a transmission signal C20 from the transfer control circuit 11 and applies a transmission acknowledging signal AK20 to the transfer control circuit 11. The transfer control circuit 31 receives a transmission signal C30 from the transfer control circuit 21 and applies a transmission acknowledging signal AK30 to the transfer control circuit 21. The transfer control circuit 31 applies a transmission signal C40 to a succeeding stage portion and receives a transmission acknowledging signal AK40 from the succeeding stage portion. The transfer control circuits 11, 21 and 31 receive external timing signals $\phi_{m+1}$, $\phi_m$ and $\phi_{m-1}$, respectively.

Again with reference to FIG. 1, the transfer control circuit 21 has an input terminal CI for receiving the transmission signal C20, an output terminal RO for outputting the transmission acknowledging signal AK20, an output terminal CO for outputting the transmission signal C30 and an input terminal RI for receiving the transmission acknowledging signal AK30.

NOR gates G11 and G12 constitute a flip-flop. The flip-flop stores information whether data exists in the data transmission path 20 or not. When data exists, the output of the gate G12 attains "H" and the output of the gate G11 attains "L". The output of the gate G11 is applied to the output terminal RO through a buffer G19. As a result, the transmission acknowledging signal AK20 attains "L" (inhibited state). When no data exists, the output of the gate G12 attains "L" and the output of the gate G11 attains "H". As a result, the transmission acknowledging signal AK20 attains "H" (acknowledged state).

The output of the gate G11 is applied to a clock terminal CK of the data hold circuit 22 through an inverter G16. The data hold circuit 22 latches and outputs input data DI in response to the rise of the output of the inverter G16.

One input terminal of the gate G12 receives a reset signal RST through an inverter G18.

Three input terminals of an AND gate G13 receive the output of the gate G12, the transmission acknowledging signal AK30 and the timing signal $\phi_m$, respectively. The gate G13 outputs a "H" signal only when the three conditions for data transfer are satisfied. More specifically, the gate G13 outputs a "H" signal when the timing signal $\phi_m$ attains "H", the data transmission path 20 holds data (the output of the gate G12 is at "H") and a data transmission path in the subsequent stage acknowledges transmission (when the transmission acknowledging signal AK30 is at "H").

NOR gates G14 and G15 constitute a RS flip-flop. The RS flip-flop is set in response to a "H" output of the gate G13 to output a "H" signal from the gate G15. The gate G15 receives the timing signal $\phi_m$ through an inverter G17. When $\phi_m$ attains "L", the RS flip-flop is reset to output a "L" signal from the gate G15. The signal output from the gate G15 is applied to the output terminal CO through a buffer G20 as well as to one input terminal of the gate G12.

An operation of the transfer control circuit 21 of FIG. 1 will be described with reference to the timing chart of FIG. 3.

FIG. 3(a) illustrates an operation in the event of receiving data from the data transmission path 10 in the preceding stage. It is assumed that no data exists in the data transmission path 20 and there exists data in the data transmission path 10.

The transmission signal C20 rises to "H" in response to a rise of the timing signal $\phi_{m+1}$. As a result, the data hold circuit 22 latches and outputs the input data DI. The transmission acknowledging signal AK20 attains "L" (inhibited state). The output of the gate G12 changes to "H". This means that the data transmission path 20 holds data.

FIG. 3(b) illustrates an operation in the event of transferring data to the data transmission path 30 in the succeeding stage. It is assumed herein that there exists data in the data transmission path 20 and no data exists in the data transmission path 30.

When the timing signal $\phi_m$ attains "H", the output of the gate G12 is at "H" (the data transmission path 20 holding the data) and the transmission acknowledging signal AK30 is at "H" (the data transmission path 30 holding no data). The output of the gate G13 therefore rises to "H". Unless the above-described three conditions are not satisfied, the output of the gate G13 remains "L" to maintain the present state.

When the output of the gate G13 attains "H", the RS flip-flop comprising the gates G14 and G15 is set to change the output of the gate G14 to "L" and the output of the gate G15 to "H". As a result, the transmission signal C30 rises to "H".

When data transmission is started in this way, the output of the gate G12 changes to "L". This means that the data transmission path 20 holds no data. The flip-flop included in the transfer control circuit 31 in the subsequent stage enters a state where data is held. At the same time, the data hold circuit 31 in the subsequent stage latches and outputs the data. The transfer control circuit 31 in the subsequent stage changes the level of the transmission acknowledging signal AK30 to "L" (inhibited state).

In response to the output of the gate G12 and the change of the transmission acknowledging signal AK30, the output of the gate G13 attains "L". With the RS flip-flop comprising the gates G14 and G15 storing information of the start of the transmission, however, the transmission is continued while the timing signal $\phi_m$ is at "H". A time necessary for the transfer control circuit in the subsequent stage to receive a stable signal can be ensured even if a waveform becomes blunt or delay is caused due to a wiring capacitance and the like when transfer control circuits are provided spaced apart from each other.

When the timing signal $\phi_m$ changes to "L", the RS flip-flip comprising the gates G14 and G15 is reset to bring the output of the gate G15 to "L". As a result, the data transmission is terminated.

Figure 4:
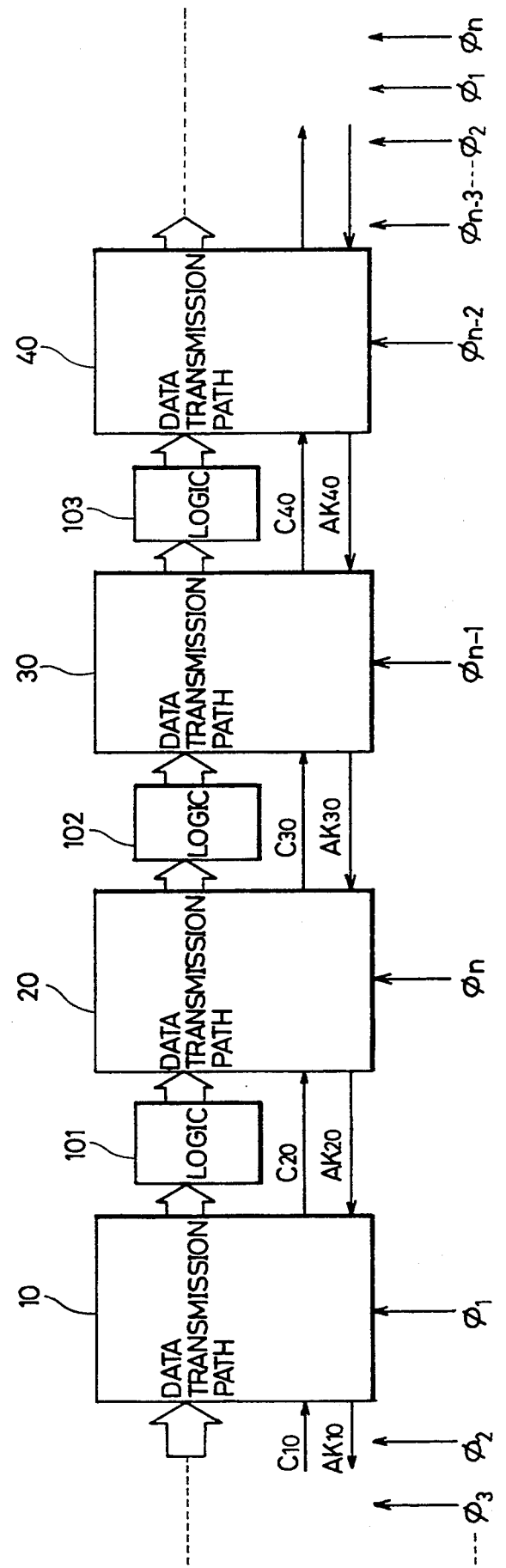
FIG. 4 is a block diagram showing an example of a use of the data transmission apparatus shown in FIG. 1.

FIG. 4 is a block diagram showing an example of a use of the data transmission path of FIG. 1.

In FIG. 4, a plurality of data transmission paths are connected in turn through predetermined logic circuits. These data transmission paths receive timing signals $\phi_1$–$\phi_n$, respectively. FIG. 4 shows data transmission paths 10, 20, 30 and 40 and logic circuits 101, 102 and 103.

Figure 5:
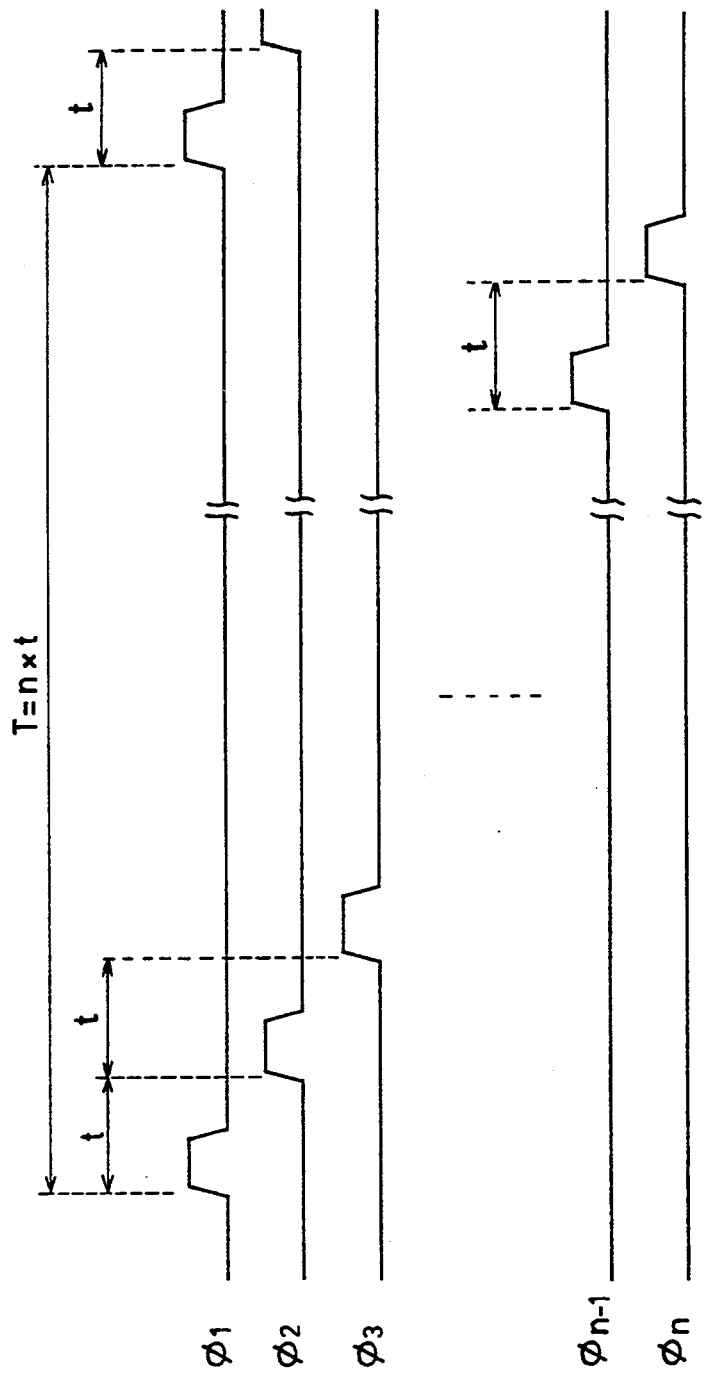
FIG. 5 is a timing chart showing timing signals.

As shown in FIG. 5, the timing signals $\phi_1$–$\phi_n$ have pulses delayed in turn by time t. The pulse cycle of each timing signal is t=n·t.

Herein, an operation of data will be considered on the assumption that the data exists in the data transmission path 20.

(1) When the transmission acknowledging signal AK30 from the data transmission path 30 in the subsequent stage is in an acknowledged state at the time point when the timing signal $\phi_n$ attains "H", the data transmission path 20 applies the transmission signal C30 to the data transmission path 30. As a result, data is transferred from the data transmission path 20 to the data transmission path 30 through the logic circuit 102.

(2) Upon data transmission path 20 becoming ready for receiving another data, the transmission acknowledging signal AK20 to be applied to the data transmission path 10 enters an acknowledged state.

(3) The data transmission path 30 latches the data in the data hold circuit to inhibit the transmission acknowledging signal AK30 until data is transferred to the data transmission path 40 in the subsequent stage.

The above-described operations are carried out when the timing signal $\phi_n$ is at "H".

(4) The data transferred to the data transmission path 30 is processed by the logic circuit 103 until the timing signal $\phi_{n-1}$ attains "H".

The above-described operations of (1)–(4) will be repeated to carry out a data transmission. The number of the timing signals is selected to be two or more.

Based on the above-described control signal, it is possible to design a data transmission apparatus while effectively using a data transmission path by arbitrarily selecting the number of timing signals in accordance with a necessary speed or delay of internal logic.

Figure 6:
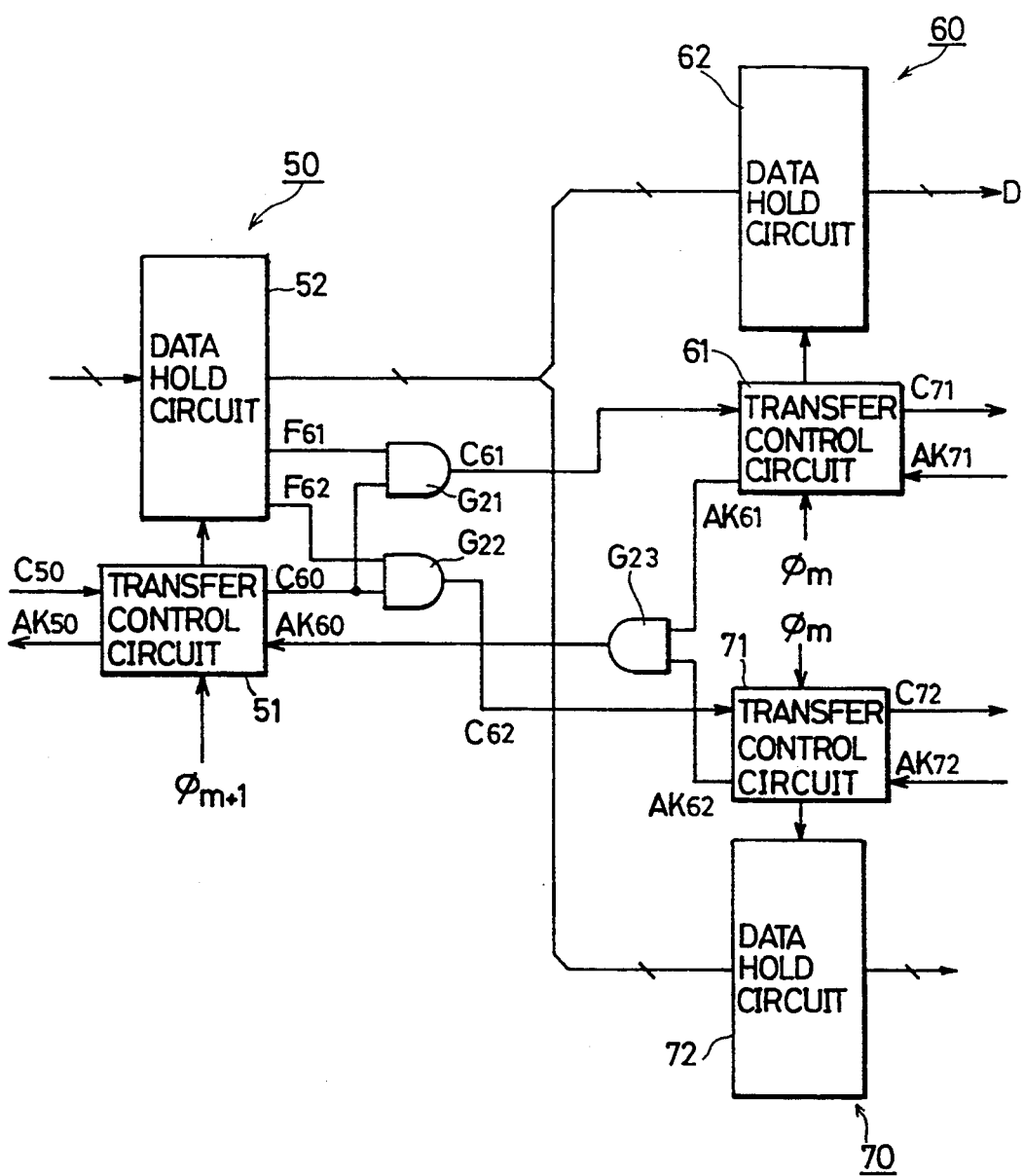
FIG. 6 is a block diagram showing the structure of a data transmission apparatus according to another embodiment of the present invention.

FIG. 6 is a block diagram showing the structure of a data transmission apparatus according to another embodiment of the present invention. The data transmission apparatus carries out a branching operation for branching data flowing through one transmission path into a plurality of transmission paths provided in parallel to each other.

A transfer control circuit 51 and a data hold circuit 52 constitute a data transmission path 50 in a preceding stage. A transfer control circuit 61 and a data hold circuit 62 constitute a first data transmission path 60 in a succeeding stage, and a transfer control circuit 71 and a data hold circuit 72 constitute a second data transmission path 70 in the succeeding stage. The structures of the transfer control circuits 51, 61 and 71 are the same as that of the transfer control circuit 21 shown in FIG. 1. The transfer control circuit 51 receives a timing signal $\phi_{m+1}$ and the transfer control circuits 61 and 71 receive timing signals $\phi_m$.

The data hold circuit 52 generates flags F61 and F62 indicative of a branch destination of data in accordance with an identifier included in the data. The flags F61 and F62 are respectively applied to one input terminal of an AND gate G21 and one input terminal of an AND gate G22. The transfer control circuit 51 receives a transmission signal C50 applied from the preceding stage portion and applies a transmission acknowledging signal AK50 to the preceding stage portion. A transmission signal C60 output from the transfer control circuit 51 is applied to the other input terminal of the gate G21 and the other input terminal of the gate G22. The output of the gate 21 is applied to the transfer control circuit 61 as a transmission signal C61 and the output of the gate 22 is applied to the transfer control circuit 71 as a transmission signal C62.

A transmission acknowledging signal AK61 output from the transfer control circuit 61 is applied to one input terminal of an AND gate G23, and a transmission acknowledging signal AK62 output from the transfer control circuit 71 is applied to the other input terminal of the AND gate G23. The transfer control circuit 61 applies a transmission signal C71 to the succeeding stage portion and receives a transmission acknowledging signal AK71 applied from the succeeding stage portion. The transfer control circuit 71 applies a transmission signal C72 to the succeeding stage portion and receives a transmission acknowledging signal AK72 applied from the succeeding stage portion.

When both of the transmission acknowledging signals AK61 and AK62 are in an acknowledged state, the transmission acknowledging signal AK60 also enters an acknowledged state. In this case, when the timing signal $\phi_{m+1}$ is at "H", the transfer control circuit 51 outputs the transmission signal C60. The flags F61 and F62 have been already settled at this time point.

When the flag F61 is at "H", the transmission signal C61 is applied to the transfer control circuit 61, and when the flag F62 is at "H", the transmission signal C62 is applied to the transfer control circuit 71. As a result, the data held by the data hold circuit 52 is transferred to either the data hold circuit 62 or 72.

Since the above-described branching operation is carried out in synchronization with a timing signal, it is easy to trace the data operation. In addition, controlling the timing signal facilitates a check of a control margin for the branching operation.

Figure 7:
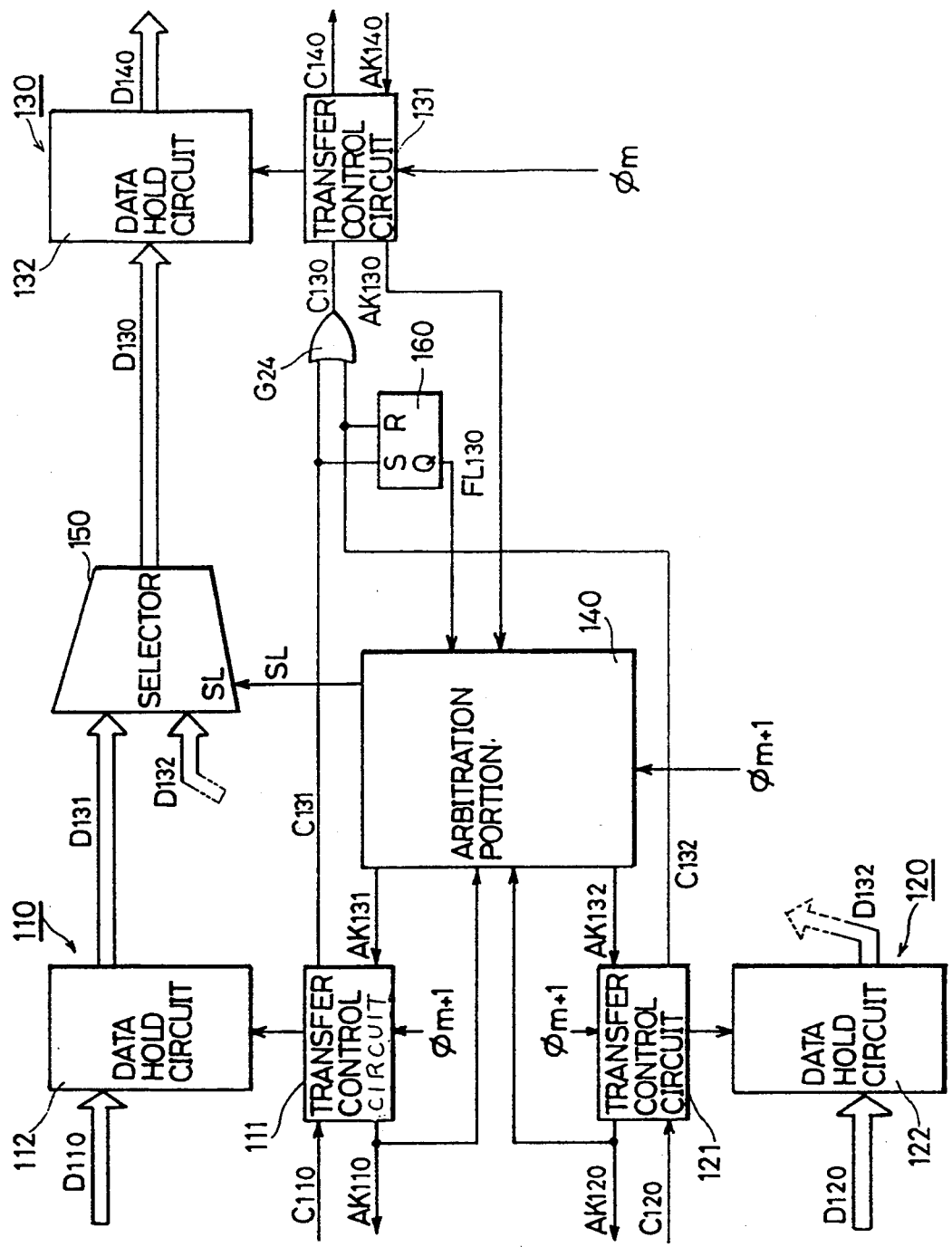
FIG. 7 is a block diagram showing the structure of a data transmission apparatus according to a further embodiment of the present invention.

FIG. 7 is a block diagram showing the structure of a data transmission apparatus according to a further embodiment of the present invention. The data transmission apparatus carries out a merging operation for sequentially transmitting the data flowing through the plurality of transmission paths provided in parallel to each other to one transmission path.

A transfer control circuit 111 and a data hold circuit 112 constitute a first data transmission path 110 in a preceding stage, and a transfer control circuit 121 and a data hold circuit 122 constitute a second data transmission path 120 in the preceding stage. A transfer control circuit 131 and a data hold circuit 132 constitute a data transmission path 130 in a succeeding stage. The structures of the transfer control circuits 111, 121 and 131 are the same as that of the transfer control circuit 21 shown in FIG. 1. The transfer control circuits 111 and 121 receive timing signals $\phi_{m+1}$ and the transfer control circuit 131 receives a timing signal $\phi_m$.

The transfer control circuit 111 receives a transmission signal C110 applied from the preceding stage portion and applies a transmission acknowledging signal AK110 to the preceding stage portion. The transfer control circuit 121 receives a transmission signal C120 applied from the preceding stage portion and applies a transmission acknowledging signal AK120 to the preceding stage portion.

A transmission signal C131 output from the transfer control circuit 111 is applied to one input terminal of an OR gate G24, and a transmission signal C132 output from the transfer control circuit 121 is applied to the other input terminal of the OR gate G24. The output of the gate G24 is applied to the transfer control circuit 131 as a transmission signal C130. The transfer control circuit 131 applies a transmission signal C140 to the succeeding stage portion and receives a transmission acknowledging signal AK140 applied from the succeeding stage portion.

The transmission signal C131 is applied to a set terminal S of a RS flip-flop 160 and the transmission signal C132 is applied to a reset terminal R of the RS flip-flop 160. The RS flip-flop 160 stores information of the data transmission path from which data has just been transmitted. An output terminal Q of the RS flip-flop 160 outputs a flag FL130.

An arbitration portion 140 receives the transmission acknowledging signal AK110 from the transfer control circuit 111, the transmission acknowledging signal AK120 from the transfer control circuit 121, a transmission acknowledging signal AK130 from the transfer control circuit 131 and the flag FL130 from the RS flip-flop 160 and applies transmission acknowledging signals AK131 and AK132 respectively to the transfer control circuits 111 and 121 and a selection signal SL to a selector 150. The transmission acknowledging signals AK110 and AK120 indicate whether data have arrived at the data hold circuits 112 and 122, respectively. The flag FL130 indicates from which data transmission path the data has been just transferred.

Data D110 is latched by the data hold circuit 110 and output to the selector 150 as data D131. Data D120 is latched by the data hold circuit 122 and applied to the selector 150 as data D132. When the timing signal $\phi_{m+1}$ is at "H", the arbitration portion 140 causes one of the transmission acknowledging signals AK131 and AK132 to enter an acknowledged state and the other to enter an inhibited state. Either the transfer control circuit 111 or 112 outputs the transmission signal C131 or C132 when the conditions for data transfer are satisfied.

As a result, the transmission signal C130 is applied from the gate G24 to the transfer control circuit 131. At the same time, the arbitration portion 140 outputs the selection signal SL. The selector 150 selects one of the data D131 and D132 in response to the selection signal SL and applies the selected data to the data hold circuit 132 as data D130. The data hold circuit 132 latches the data D130 and outputs the same as data D140.

Figure 8:
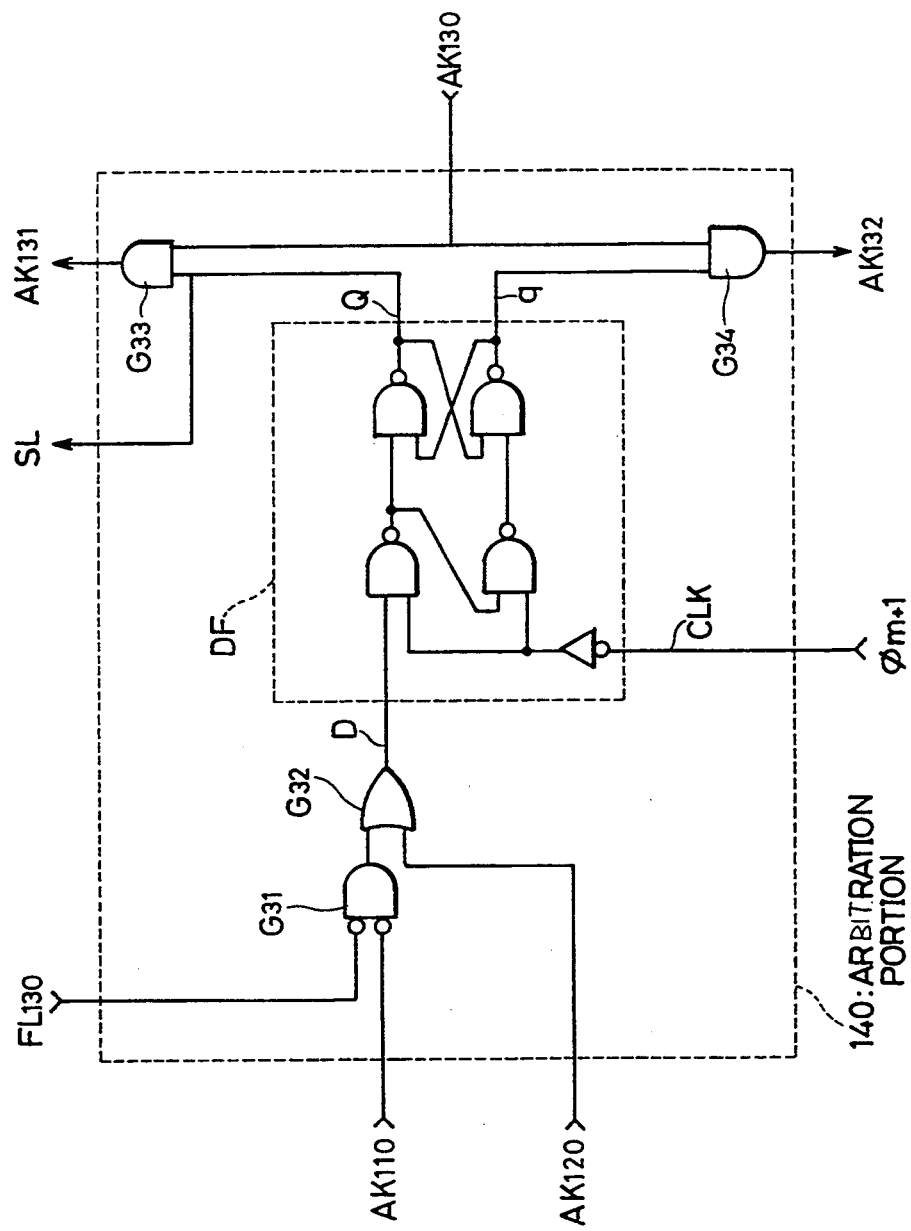
FIG. 8 is a circuit diagram showing the structure of an arbitration portion shown in FIG. 7.

FIG. 8 is a circuit diagram showing the structure of the arbitration portion 140.

An NOR gate G31 and an OR gate G32 determine whether the data transmission path 110 or 120 (see FIG. 7) is permitted to transfer data. The transmission signals AK110 and AK120 and the flag FL130 are settled when at least the timing signal $\phi_{m+1}$ is at "H".

FIG. 9 is a truth table indicative of the output of the OR gate G32 in the arbitration portion 140. The transmission acknowledging signals AK110 and AK120 attain "0" ("L") when data exist in the data transmission paths 110 and 120 and otherwise attain "1" ("H"). If the data which has been just transmitted to the data transmission path 130 comes from the data transmission path 110, the flag FL130 attains "1" and if it comes from the data transmission path 120, the flag attains "0". The output of the OR gate G32 attains "1" when the data transmission path 110 is selected and attains "0" when the data transmission path 120 is selected.

As shown in FIG. 9, when data exists in the data transmission path 110 and no data exists in the data transmission path 120, that is, when AK110 and AK120 are at 0 and 1, respectively, the data transmission path 110 is selected irrespective of the state of the flag FL130. Conversely, when there exists no data in the data transmission path 110 and data exists in the data transmission path 120, that is, when AK110 and AK120 are at 1 and 0, respectively, the data transmission path 120 is selected irrespective of the state of the flag FL130. When data exist in both of the data transmission paths 110 and 120, that is, when AK110 and AK120 are at 0, a data transmission path is selected which is different from the data transmission path which has been just selected. When data exists in neither of data transmission paths 110 and 120, that is, when AK110 and AK120 are 1, no data transfer is carried out and any of the transmission paths is selectable.

Again with reference to FIG. 8, the output of the gate G32 is applied to an input terminal D of a D type flip-flop DF. A clock terminal CLK of the flip-flop DF receives the timing signal $\phi_{m+1}$.

When the timing signal $\phi_{m+1}$ is at "L", the output of the gate G32 determines a state of the flip-flop DF. The output from an output terminal Q of the flip-flop DF is applied to one input terminal of an AND gate G33 and also to the selector 150 (see FIG. 7) as the selection signal SL. The output from an inversion output terminal q of the flip-flop DF is applied to one input terminal of an AND gate G34. The transmission acknowledging signal AK130 is applied to the other input terminals of the gates G33 and G34. The output of the gate G33 serves as the transmission acknowledging signal AK131 and the output of the gate G34 serves as the transmission acknowledging signal AK132.

In the flip-flop DF, the internal state and the output are changed in response to a signal level at the input terminal D when the timing signal $\phi_{m+1}$ is at "L". When the timing signal $\phi_{m+1}$ is at "H", the output at the time when the timing signal $\phi_{m+1}$ attains "H" is maintained even if the level of the signal at the input terminal D is changed. The outputs Q and q of the flip-flop DF and the selection signal SL therefore do not change even if the transmission acknowledging signals AK110 and AK120 or the flag FL130 are changed during the data transmission after the transmission signal C131 or C132 is output.

When the transmission acknowledging signal AK130 is at "H" (acknowledged state) at the time when the timing signal $\phi_{m+1}$ attains "H", one of the transmission acknowledging signals AK131 and AK132 attains "H" (acknowledged state) and the other attains "L" (inhibited state).

Figure 10:
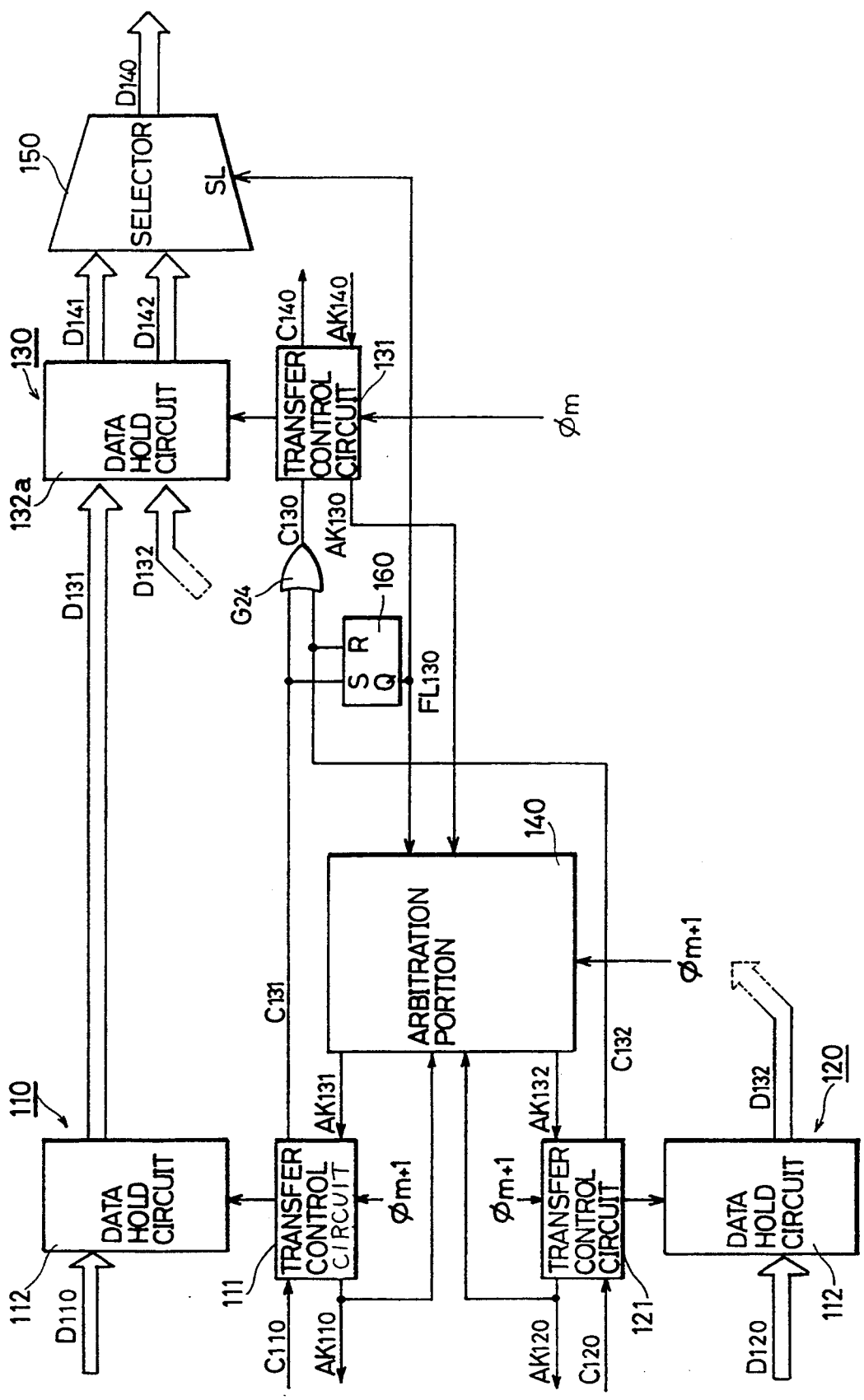
FIG. 10 is a block diagram showing the structure of a data transmission apparatus according to a still further embodiment of the present invention.

FIG. 10 is a block diagram showing the structure of a data transmission apparatus according to a still further embodiment of the present invention.

The embodiment of FIG. 10 differs from that of FIG. 7 in that a data hold circuit 132a replaces the data hold circuit 132 and the selector 150 is connected to the output of the data hold circuit 132a.

The data hold circuit 132a is capable of receiving the data D131 from the data hold circuit 112 and the data D132 from the data hold circuit 122 in parallel. The data hold circuit 132a latches the data D131 and outputs the same as data D141 and latches the data D132 and outputs the same as data D142. The selector 150 selects either data D141 or D142 based on the flag FL130 applied from the RS flip-flop 160 and passes the same as the data D140.

The merging operations in the embodiments shown in FIGS. 7 and 10 are carried out in synchronization with the timing signals, thereby to facilitating tracing of the data operation. In addition, the control margin for the merging operation can be easily checked by controlling the timing signals.

Figure 11:
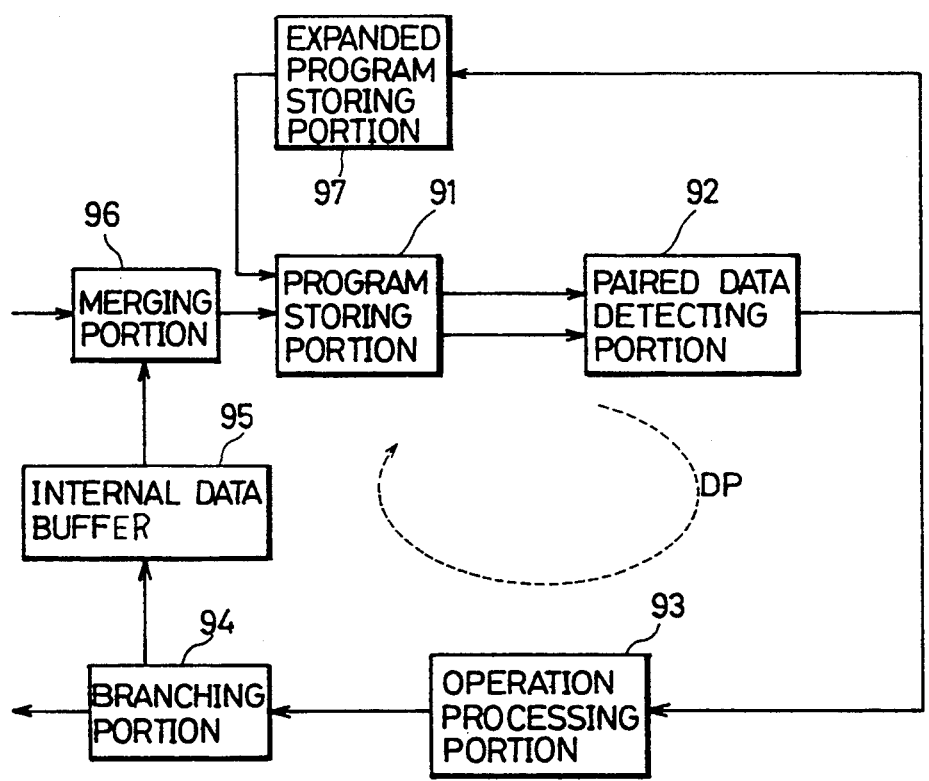
FIG. 11 is a block diagram showing the structure of a data flow type information processor to which the present invention is applied.
Figure 12:
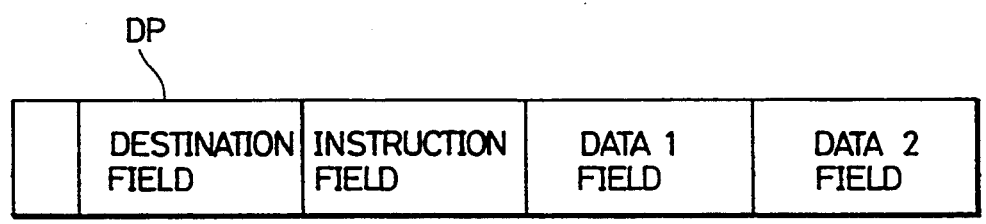
FIG. 12 is a diagram showing the field arrangement of a data packet to be processed by the data flow type information processor.

The transmission apparatus according to the present invention is applicable to a data flow type information processor, for example. FIG. 11 is a block diagram showing one example of the structure of a data flow type information processor. FIG. 12 is a diagram showing one example of a field arrangement of a data packet to be processed by the information processor.

A data packet DP shown in FIG. 12 includes a destination field, an instruction field, a data 1 field and a data 2 field. The destination field stores destination information, the instruction field stores instruction information and the data 1 field and the data 2 field store operand data.

Figure 13:
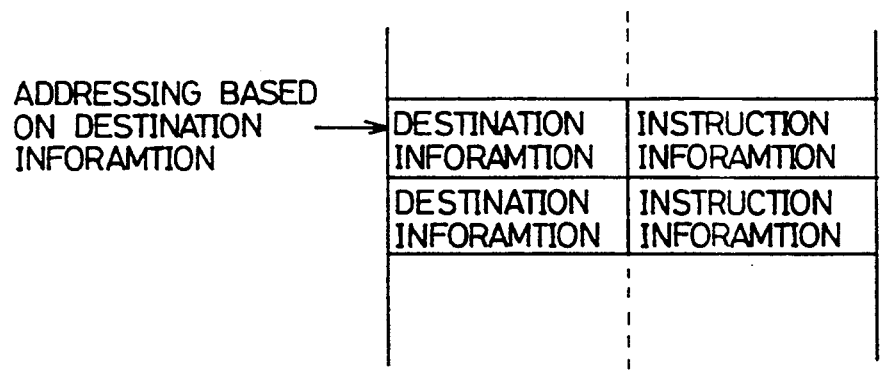
FIG. 13 is a diagram showing a part of a data flow program stored in a program storing portion of the data flow type information processor.
Figure 14:
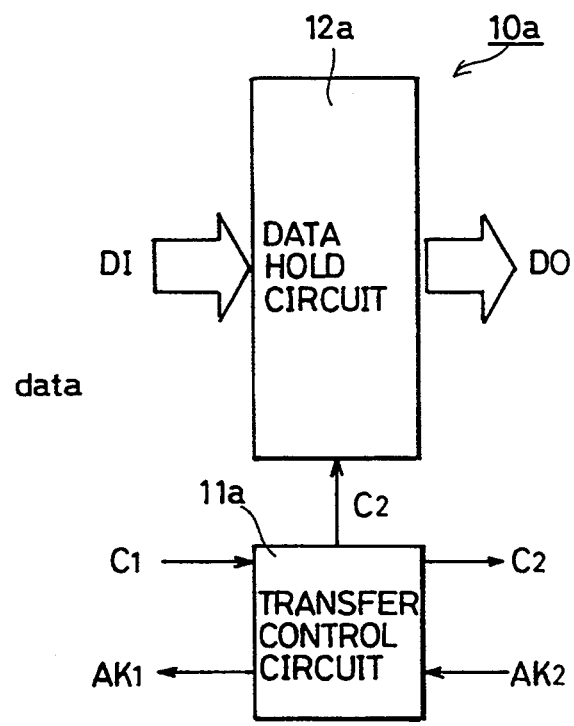
FIG. 14 is a block diagram showing the structure of a conventional data transmission apparatus.
Figure 15:
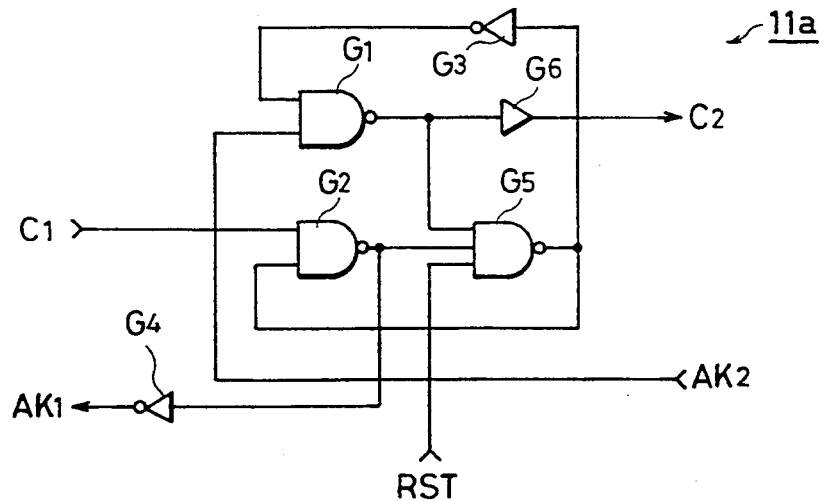
FIG. 15 is a circuit diagram showing the structure of a transfer control circuit shown in FIG. 14.
Figure 16:
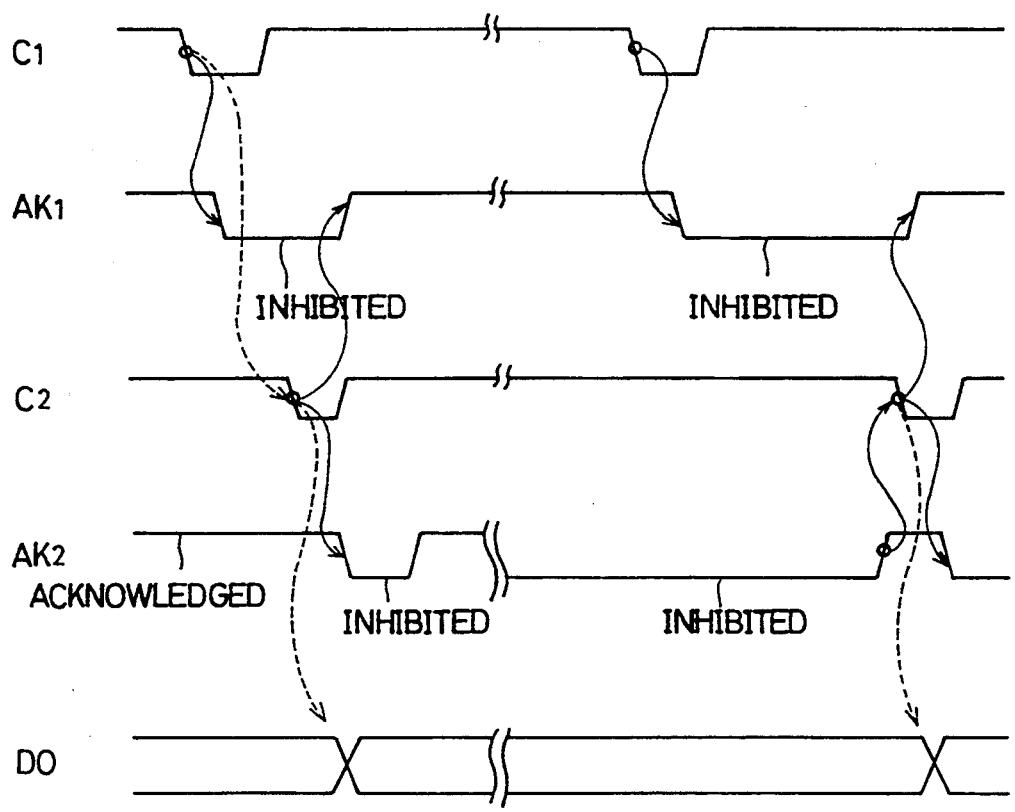
FIG. 16 is a timing chart illustrating an operation of the transfer control circuit of FIG. 15.

In FIG. 11, a program storing portion 91 stores a data flow program shown in FIG. 13. Each row of the data flow program comprises the destination information and instruction information. The program storing portion 91 reads the destination information and the instruction information of the data flow program by an address designation made based on the destination information of the input data packet, stores the destination information and the instruction information in the destination field and the instruction field of the data packet, respectively, and outputs the data packet, as shown in FIG. 13.

A paired data detecting portion 92 queues data packets output from the program storing portion 91. That is, when instruction information indicates a 2-input instruction, the paired data detection portion detects two different data packets having the same destination information, stores the operand data (the contents of the data 1 field shown in FIG. 12) of one of these data packets in the data 2 field of the other data packet and outputs the other data packet. When the instruction information indicates a 1-input instruction, the input data packet is output without being changed.

An operation processing portion 93 operates the data packet output from the paired data detecting portion 92 based on the instruction information, stores the result in the data 1 field of the data packet and outputs the data packet to a branching portion 94. The branching portion 94 applies the data packet to a merging portion 96 through an internal data buffer 95 or externally outputs the data packet. The merging portion 96 outputs the data packet from the internal data buffer 95 or an external data packet to the program storing portion 91 in the order of arrival.

As a data packet continues to circulate through the program storing portion 91, the paired data detecting portion 92, the operation processing portion 93, the branching portion 94, the internal data buffer 95, the merging portion 96 and the program storing portion 91 . . . , the operation processing proceeds based on the data flow program stored in the program storing portion 91. An extended program storing portion 97 stores a data flow program of the same form as that of the data flow program shown in FIG. 13. When a data packet output from the paired data detecting portion 92 is input to the extended program storing portion 97, the data flow program is read in accordance with an address designation made based on the destination information of the data packet and loaded in the program storing portion 91.

The data transmission apparatus according to the embodiment shown in FIG. 1 can be used for a data transmission path coupling respective processing portions. The data transmission apparatus according to the embodiment shown in FIG. 6 can be used for the branching portion 94. The data transmission apparatuses according to the embodiments shown in FIGS. 7 and 10 can be used for the merging portion 96. In this case, a data flow in the information processor can be externally controlled to facilitate tracing of a data operation, thereby enabling an operation margin to be checked.

The timing signals can be externally applied to the information processor. A timing signal generation circuit can be provided in the information processor. In this case, data is transferred in synchronization with a timing signal when a preceding stage portion is empty and data transfer is held off when the preceding stage portion is clogged in each data transmission apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission apparatus for transmitting data packets applied from a preceding transmission stage to a succeeding transmission stage, comprising:

holding means for holding a data packet applied from said preceding transmission stage; and controlling means for controlling transfer of the data packet held by said holding means, said controlling means performing control such that the data packet held by said holding means is transferred to said succeeding transmission stage in response to existence of a data packet to be transferred in said holding means, non-existence of a data packet in said succeeding transmission stage and an application of an externally provided predetermined timing signal, said controlling means comprising, first storing means being set in response to receipt of a first transmission signal, from said preceding transmission stage indicative that the data packet has been transferred to said holding means from said preceding transmission stage, logic means for receiving an output of said first storing means, a signal indicative of existence or non-existence of a data packet in said succeeding transmission stage and said predetermined timing signal and for supplying a predetermined output in response to a setting of said first storing means, non-existence of a data packet in said succeeding transmission stage and an application of said predetermined timing signal, and second storing means being set in response to said predetermined output of said logic means and being reset in response to a low signal level of said predetermined timing signal, the data packet held by said holding means being transferred to said succeeding transmission stage and said first storing means being reset in response to the setting of said second storing means.

2. The data transmission apparatus according to claim 1, wherein said first storing means is set and applies to said preceding transmission stage a signal inhibiting a data packet transfer, in response to receipt of said first transmission signal, and said second storing means, when set, generates a second transmission signal for transferring the data packet from said holding means to said succeeding transmission stage.

3. The data transmission apparatus according to claim 1, wherein said first storing means comprises a flip-flop, said second storing means comprises a flip-flop, and said logic means comprises logical product means.

4. A data transmission apparatus for transferring data packets applied from a preceding transmission stage to one of a plurality of succeeding transmission stages, a data packet including an identifier for specifying one of said plurality of succeeding transmission stages, the data transmission system comprising:

holding means for holding a data packet applied from said preceding transmission stage; and controlling means for controlling transfer of the data packet held by said holding means, said controlling means performing control such that the data packet held by said holding means is transferred to one of said plurality of succeeding transmission stages based on said identifier in response to existence of a data packet to be transferred in said holding means, non-existence of a data packet in said plurality of succeeding transmission stages and an application of an externally provided predetermined timing signal, said controlling means comprising first storing means being set in response to receipt of a first transmission signal from said preceding transmission stage indicative that the data packet has been transferred to said holding means from said preceding transmission stage, logic means for receiving an output of said first storing means, a signal indicative of existence or non-existence of a data packet in said plurality of succeeding transmission stages and said predetermined timing signal and for supplying a predetermined output in response to a setting of said first storing means, non-existence of a data packet in said plurality of succeeding transmission stages and an application of said predetermined timing signal, and second storing means being set in response to said predetermined output of said logic means and being reset in response to a low signal level of said predetermined timing signal, the data packet held by said holding means being transferred to a succeeding transmission stage designated by said identifier and said first storing means being reset in response to the setting of said second storing means.

5. The data transmission apparatus according to claim 4, wherein said first storing means is set and applies to said preceding transmission stage a signal for inhibiting a data packet transfer, in response to said first transmission signal, and said second storing means, when set, generates a second transmission signal for transferring the data packet from said holding means to one of said succeeding transmission stages.

6. The data transmission apparatus according to claim 4, wherein said first storing means comprises a flip-flop, said second storing means comprises a flip-flop, and said logic means comprises logical product means.

7. A data transmission apparatus for transferring data packets applied from a plurality of preceding transmission stages to a succeeding transmission stage, comprising:

a plurality of holding means provided corresponding to said plurality of preceding transmission stages, each for holding a data packet applied from a corresponding preceding transmission stage;

a plurality of controlling means provided corresponding to said plurality of holding means, each for controlling transfer of the data packet held by a corresponding holding means; and arbitrating means for selectively acknowledging data packet transfer by one of said plurality of controlling means, each of said plurality of controlling means performing control such that the data packet held by a corresponding holding means is transferred to said succeeding transmission stage in response to existence of a data packet to be transferred in a corresponding one of said plurality of holding means, non-existence of a data packet in said succeeding transmission stage, an acknowledgement of data packet transfer by said arbitrating means and an application of an externally provided predetermined timing signal, said arbitrating means maintaining a present state when said predetermined timing signal is being applied, each of said plurality of controlling means comprising first storing means being set in response to receipt of a respective first transmission signal from a corresponding one of said plurality of preceding transmission stages indicative that the data packet has been transferred to the corresponding one of said plurality of holding means from the corresponding one of said plurality of preceding transmission stages, logic means for receiving an output of said first storing means, a signal indicative of existence or non-existence of a data packet in said succeeding transmission stage and said predetermined timing signal and for supplying a predetermined output in response to a setting of said first storing means, non-existence of a data packet in said succeeding transmission stage and an application of said predetermined timing signal, and second storing means being set in response to said predetermined output of said logic means and being reset in response to a low signal level of said predetermined timing signal, the data packet held by the corresponding one of said plurality of holding means being transferred to said succeeding transmission stage and said first storing means being reset, in response to the setting of said second storing means.

8. The data transmission apparatus according to claim 7, wherein when a data packet exists in one of said plurality of holding means, said arbitrating means permits said one of said plurality of holding means to transfer the data packet and when a data packet exists in all of said plurality of holding means at the same time, assigns priority to a controlling means to transfer data, which controlling means is different from that which has been most recently assigned priority.

9. The data transmission apparatus according to claim 7, wherein each of said first storing means is set in response to a respective first transmission signal and applies to a corresponding one of said plurality of preceding transmission stages a signal for inhibiting data packet transfer, and said second storing means, when set, generates a respective second transmission signal for transferring data packet from a corresponding one of said plurality of holding means to said succeeding transmission stage.

10. The data transmission apparatus according to claim 7, wherein said first storing means comprises a flip-flop, said second storing means comprises a flip-flop, and said logic means includes logical product means.

11. A method of operating a data transmission apparatus for transmitting data packets applied from a preceding transmission stage to a succeeding transmission stage, comprising the steps of:

holding a data packet applied from the preceding transmission stage; and transferring the held data packet to the succeeding transmission stage in response to holding of data packet to be transferred, non-existence of a data packet in the succeeding transmission stage and an application of an externally provided predetermined timing signal, said step of transferring comprising setting first storing means in response to receipt of a first transmission signal from the preceding transmission stage indicative that a data packet has been transferred to and held by the data transmission apparatus, generating a predetermined signal in response to an output of the first storing means indicative of setting of the first storing means, a signal indicative of nonexistence of a data packet in the succeeding transmission stage and application of the predetermined timing signal, and setting of second storing means in response to generation of the predetermined signal, the second storing means being reset in response to a low signal level of the predetermined signal, the data packet held by the data transmission apparatus being transferred to the succeeding transmission stage and the first storing means being reset in response to the setting of the second storing means.

12. A method of operating a data transmission apparatus for transmitting data packets supplied from a preceding transmission stage to one of a plurality of succeeding transmission stages, comprising the steps of:

holding a data packet applied from the preceding transmission stage; and transferring the held data packet to a succeeding transmission stage designated by an identifier present in the data packet, in response to holding of a data packet to be transferred, non-existence of a data packet in the plurality of succeeding transmission stages and an application of an externally provided predetermined timing signal, said step of transferring comprising setting first storing means in response to receipt of a first transmission signal from the preceding transmission stage indicative that a data packet has been transferred to and held by the data transmission apparatus, generating a predetermined signal in response to an output of the first storing means indicative of setting of the first storing means, a signal indicative of nonexistence of a data packet in the plurality of succeeding transmission stages and application of the predetermined timing signal, and setting of second storing means in response to generation of the predetermined signal, the second storing means being reset in response to a low signal level of the predetermined signal, the data packet held by the data transmission apparatus being transferred to a succeeding transmission stage designated by the identifier and the first storing means being reset in response to the setting of the second storing means.

13. A method of operating a data transmission apparatus for transferring data packets applied from a plurality of preceding transmission stages to a succeeding transmission stage, comprising the steps of:

holding respective data packets applied from the plurality of preceding transmission stages;

selectively acknowledging transfer of one of the data packets applied from the plurality of preceding transmission stages while an externally provided predetermined timing signal is applied; and transferring the acknowledged data packet to the succeeding transmission stage in response to holding of a data packet to be transferred, non-existence of a data packet in the succeeding transmission stage, an acknowledgement of data packet transfer and an application of the predetermined timing signal, said step of transferring comprising setting first storing means in response to receipt of a respective first transmission signal from a corresponding one of the plurality of the preceding transmission stages indicative that a data packet has been transferred to and held by the data transmission apparatus, generating a predetermined signal in response to an output of the first storing means indicative of setting of the first storing means, a signal indicative of nonexistence of a data packet in the succeeding transmission stage and application of the predetermined timing signal, and setting of second storing means in response to generation of the predetermined signal, the second storing means being reset in response to a low signal level of the predetermined signal, the data packet held by the data transmission means being transferred to the succeeding transmission stage and the first storing means being reset in response to the setting of the second storing means.

14. The data transmission apparatus according to claim 1, wherein said predetermined timing signal comprises multi-phase timing signals supplied respectively to said preceding transmission stage, the data transmission apparatus and said succeeding stage portion.

15. The data transmission apparatus according to claim 14, wherein a phase of the respective multi-phase timing signal provided to the data transmission apparatus is delayed by a predetermined time period t with respect to a phase of the respective multi-phase timing signal provided to said preceding transmission stage and a phase of the respective multi-phase timing signal provided to said succeeding transmission stage is delayed by the predetermined time period t with respect to the phase of the respective multi-phase timing signal provided to the data transmission apparatus.

16. The data transmission apparatus according to claim 4, wherein said predetermined timing signal comprises multi-phase timing signals supplied respectively to said preceding transmission stage portion, the data transmission apparatus and the succeeding transmission stages.

17. The data transmission apparatus according to claim 16, wherein a phase of the respective multi-phase timing signal provided to the data transmission apparatus is delayed by a predetermined time period t with respect to a phase of the respective multi-phase timing signal provided to said preceding transmission stage and a phase of the respective multi-phase timing signal provided to said succeeding transmission stages is delayed by the predetermined time period t with respect to the phase of the respective multi-phase timing signal provided to the data transmission apparatus.

18. The data transmission apparatus according to claim 7, wherein said predetermined timing signal comprises multi-phase timing signals supplied respectively to said preceding transmission stages, the data transmission apparatus and the succeeding transmission stage.

19. The data transmission apparatus according to claim 18, wherein a phase of the respective multi-phase timing signal provided to the data transmission apparatus is delayed by a predetermined time period t with respect to a phase of the respective multi-phase timing signal provided to said preceding transmission stages and a phase of the respective multi-phase timing signal provided to said succeeding transmission state is delayed by the predetermined time period t with respect to the phase of the respective multi-phase timing signal provided to the data transmission apparatus.

20. The method of operating a data transmission apparatus according to claim 11, wherein the predetermined timing signal comprises multi-phase timing signals which are supplied respectively to the preceding transmission stage, the data transmission apparatus and the succeeding transmission stage.

21. The method of operating a data transmission apparatus according to claim 20, comprising delaying a phase of the respective multi-phase timing signal supplied to the data transmission apparatus by a predetermined time period t with respect to a phase of the respective multi-phase timing signal supplied to the preceding transmission stage and delaying a phase of the respective multi-phase timing signal supplied to the succeeding transmission stage by the predetermined time period t with respect to the phase of the respective multi-phase timing signal supplied to the data transmission apparatus.

22. The method of operating a data transmission apparatus according to claim 12, wherein the predetermined timing signal comprises multi-phase timing signals which are supplied respectively to the preceding transmission stage, the data transmission apparatus and the succeeding transmission stages.

23. The method of operating a data transmission apparatus according to claim 22, comprising delaying a phase of the respective multi-phase timing signal supplied to the data transmission apparatus by a predetermined time period t with respect to a phase of the respective multi-phase timing signal supplied to the preceding transmission stage and delaying a phase of the respective multi-phase timing signal supplied to the succeeding transmission stages by the predetermined time period t with respect to the phase of the respective multi-phase timing signal supplied to the data transmission apparatus.

24. The method of operating a data transmission apparatus according to claim 13, wherein the predetermined timing signal comprises multi-phase timing signals which are supplied respectively to the preceding transmission stages, the data transmission apparatus and the succeeding transmission stage.

25. The method of operating a data transmission apparatus according to claim 24, comprising delaying a phase of the respective multi-phase timing signal supplied to the data transmission apparatus by a predetermined time period t with respect to a phase of the respective multi-phase timing signal supplied to the preceding transmission stages and delaying a phase of the respective multi-phase timing signal supplied to the succeeding transmission stage by the predetermined time period t with respect to the phase of the respective multi-phase timing signal supplied to the data transmission apparatus.

* * * * *